(12) United States Patent
Ferracane et al.

(10) Patent No.: US 12,179,465 B2
(45) Date of Patent: Dec. 31, 2024

(54) EXPANDING STORAGE BAGS

(71) Applicant: THE GLAD PRODUCTS COMPANY, Oakland, CA (US)

(72) Inventors: Dean Ferracane, Willowbrook, IL (US); John Rusnak, Willowbrook, IL (US)

(73) Assignee: The Glad Products Company, Oakland, CA (US)

(*) Notice: Subject to any disclaimer, the term of this patent is extended or adjusted under 35 U.S.C. 154(b) by 115 days.

(21) Appl. No.: 18/046,401

(22) Filed: Oct. 13, 2022

(65) Prior Publication Data
US 2023/0211576 A1    Jul. 6, 2023

Related U.S. Application Data

(62) Division of application No. 17/624,810, filed as application No. PCT/US2020/041776 on Jul. 13, 2020, now Pat. No. 11,498,308.
(Continued)

(51) Int. Cl.
*B32B 3/30* (2006.01)
*B31B 70/81* (2017.01)
(Continued)

(52) U.S. Cl.
CPC ............ *B32B 3/30* (2013.01); *B31B 70/8132* (2017.08); *B32B 27/08* (2013.01); *B32B 27/32* (2013.01);
(Continued)

(58) Field of Classification Search
CPC ........... B32B 3/30; B32B 27/08; B32B 27/32; B32B 2439/46; B32B 2439/70; B32B 2250/02; B32B 3/02; B32B 2307/412; B32B 3/28; B32B 2250/242; B32B 2307/414; B32B 2439/06; B31B 70/8132; B31B 70/88; B31B 2155/001; B31B 2155/0014; B31B 2160/10;
(Continued)

(56) References Cited

U.S. PATENT DOCUMENTS 5,076,040 A    12/1991  Davis
2010/0266222 A1  10/2010  Rusnak et al.
(Continued)

FOREIGN PATENT DOCUMENTS

CN    1042120 A    5/1990
CN    1356954 A    7/2002
(Continued)

OTHER PUBLICATIONS

Examination Report as received in Australian application 2020315583 dated Apr. 29, 2022.
(Continued)

*Primary Examiner* — James C Yager
(74) *Attorney, Agent, or Firm* — Keller Preece PLLC (57) ABSTRACT

A thermoplastic bag includes raised rib-like elements that allow the thermoplastic bag to expand. The thermoplastic bag further includes side seals having rib-like elements that allow the side seals to expand. Additionally, in one or more implementations, the thermoplastic bag includes one or more of a material formulation, a density of raised rib-like elements, a height of raised rib-like elements, or land areas that provide the raised rib-like elements with a reduced rebound ratio.

20 Claims, 6 Drawing Sheets

Related U.S. Application Data (60) Provisional application No. 62/875,645, filed on Jul. 18, 2019.

(51) Int. Cl.
  *B32B 27/08* (2006.01)
  *B32B 27/32* (2006.01)
  *B65D 21/08* (2006.01)
  *B65D 33/25* (2006.01)
  *B31B 70/88* (2017.01)
  *B65D 30/08* (2006.01)

(52) U.S. Cl.
  CPC ......... *B65D 21/08* (2013.01); *B65D 33/2508* (2013.01); *B31B 70/88* (2017.08); *B32B 2439/46* (2013.01); *B32B 2439/70* (2013.01); *B65D 31/02* (2013.01); *Y10T 428/1334* (2015.01); *Y10T 428/1352* (2015.01)

(58) Field of Classification Search
  CPC ..... B31B 2170/30; B31B 70/10; B31B 70/16; B31B 70/262; B31B 70/36; B31B 70/645; B65D 21/08; B65D 33/2508; B65D 31/02; B65D 33/00; Y10T 428/1334; Y10T 418/1352
  See application file for complete search history.

(56) References Cited

U.S. PATENT DOCUMENTS

| | | |
|---|---|---|
| 2011/0052104 A1 | 3/2011 | Wilcoxen et al. |
| 2011/0117307 A1 | 5/2011 | Fraser et al. |
| 2012/0005993 A1 | 1/2012 | Doll |
| 2012/0064271 A1 | 3/2012 | Broering et al. |
| 2013/0259408 A1 | 10/2013 | Borchardt et al. |
| 2015/0003757 A1 | 1/2015 | Wilcoxen et al. |
| 2016/0271864 A1 | 9/2016 | Dorsey et al. |

FOREIGN PATENT DOCUMENTS

| | | |
|---|---|---|
| CN | 102224085 A | 10/2011 |
| CN | 102883966 A | 1/2013 |
| WO | 200072651 A2 | 12/2000 |

OTHER PUBLICATIONS

Examination Report as received in Canadian application 3,146,840 dated Feb. 25, 2022.
International Search Report & Written Opinion as received in PCT/US2020/0041776 dated Sep. 25, 2020.
Office Action as received in Chinese application 202080051874.3 dated May 10, 2022 [no English translation available].
U.S. Appl. No. 17/624,810, Sep. 28, 2022, Notice of Allowance.
Office Action as received in Chinese application 202080051874.3 dated Feb. 23, 2023 [no English translation available].
Notice of Preliminary Rejection as received in Korean application 10-2022-7001648 mailed Jun. 2, 2022.
Notice of Allowance as received in Korean application 10-2022-7001648 mailed Nov. 9, 2022.
Examination Report as received in Australian application 20203200363 dated Mar. 8, 2024.

EXPANDING STORAGE BAGS

CROSS-REFERENCE TO RELATED APPLICATIONS

The present application is a divisional application of U.S. patent application Ser. No. 17/624,810, filed Jan. 4, 2022, which is a National Stage Entry of PCT Application No. PCT/US2020/041776, filed Jul. 13, 2020, which claims the benefit of and priority to U.S. Provisional Application No. 62/875,645, filed on Jul. 18, 2019. The disclosures of which are herein incorporated by reference in their entirety.

BACKGROUND

1. Technical Field

The present application relates generally to thermoplastic bags and methods of making thermoplastic bags. More particularly, the present application relates to expandable thermoplastic bags.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for its intended use. For example, manufacturers may attempt to increase or otherwise control the tensile strength, tear resistance, and impact resistance of a thermoplastic film. Manufacturers may attempt to control or change the material properties of a thermoplastic film by stretching the film. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction. As used herein, the term "diagonal direction" or "DD" refers to a direction across the film that is at an angle to both the transverse and machine directions.

One form of stretching involves forming a structural elastic-like film (SELF). SELF'ing involves passing a film through intermeshing rollers that press a portion of the film out of plane to cause permanent deformation of the portion of the film in the Z-direction. SELF'ing a film can increase the elasticity of the film.

While SELF'ing can provide a film with desirable properties, these processing techniques can have drawbacks. For example, SELF'ed thermoplastic films, when formed into bags, have deformation patterns that are continuous from one side of the bag to the opposing side of the bag due to manufacturing constraints. The continuous nature of conventional SELF'ing result in side seals that are formed over areas that have been SELF'ed. Forming side seals over areas that have been SELF'ed can lead to weakened seals due to a zippering effect (e.g., inconsistent sealing of the films). Similarly, the thinning of the films in the areas in which the seals are formed can lead to pins holes or other weaknesses. Weakened seals can lead to leaks or even failure of the bag. Seal quality is exacerbated when air is introduced between the layers as is traditionally done when the bag is pre-opened to reduce difficulty in opening the bag for consumers.

In view of the foregoing, conventional thermoplastic bags with SELF'ing can lack SELF'ing in areas where seals are formed or include relatively thick side seals to ensure a strong seal. Also, increasing the sealing temperature to create "stronger" seals can decrease the elasticity of the film. In any of these cases, the resulting side seals can be non-elastic or otherwise resistant to stretching or expanding. This can result in increased strain on the side seals when the SELF'ed body of the bag is expanded and the seals resist expanding. This increased strain can lead to failure of the seals.

In addition to the foregoing, conventional SELF'ed bags can be elastic. In other words, once stretched, the conventional SELF'ed bags can attempt to rebound or return to their pre-stretched state. As such, when a bag is stuffed with contents that cause the SELF'ed bag to stretch and expand and the bag is closed via a closure mechanism, the tendency of the conventional SELF'ed bag to rebound can put increased strain on the side seals and the closure mechanism. This increased strain can lead to unintended opening of the closure mechanism and/or failure of the seals.

BRIEF SUMMARY

One or more implementations of the present invention provide benefits and/or solve one or more of the foregoing or other problems in the art with thermoplastic bags with flexible side-seals and/or low recovery force. In particular, in one or more implementations, a thermoplastic bag includes a first seal and at least a second seal that have the ability to expand or flex. The ability of the seals to expand and flex can provide the thermoplastic bag with greater ability to expand rather than tear or otherwise fail when strained. Furthermore, the flexible seals can absorb forces by expanding, and thereby, reduce strain on a closure mechanism of the thermoplastic bag.

For example, an implementation of a thermoplastic bag with flexible side seals comprises first and second sidewalls comprising a thermoplastic material. The first and second sidewalls comprise a first side edge, an opposite second side edge, a bottom edge, and an opening along respective top edges. The thermoplastic bag includes a closure mechanism that provides for selective closing of the top edges. The thermoplastic bag also includes a first side seal extending along the first side edge and a second side seal extending along the second side edge. The thermoplastic bag further includes raised rib-like elements formed in the first and second sidewalls and the first and second side seals. The raised rib-like elements formed in the first and second side seals provide the first and second side seals with an ability to expand.

Additionally, in another implementation, a thermoplastic bag comprises first and second sidewalls comprising a thermoplastic material. The first and second sidewalls comprise a first side edge, an opposite second side edge, a bottom edge, and an opening along respective top edges. The thermoplastic bag includes a closure mechanism that provides for selective closing of the top edges. The thermoplastic bag also includes a first side seal extending along the first side edge and a second side seal extending along the second side edge. The thermoplastic bag also includes a plurality of raised rib-like elements formed in the first and second sidewalls. The plurality of raised rib-like elements have a rebound ratio such that when the raised rib-like elements undergo an expansion of 15-30 percent under a strain of 3 to 6 pounds, the raised rib-like elements rebound less than 50 percent of the expansion.

In addition to the foregoing, a method of forming thermoplastic bags with expandable seals involves providing a thermoplastic film with a top edge and a bottom edge. The method then involves folding the thermoplastic film along its width to bring the bottom edge proximate the top edge and to form a first film half and a second film half joined at a bottom fold. The method further involves passing the folded thermoplastic film through a pair of SELF'ing intermeshing rollers to form a plurality of raised rib-like elements in the first film half and the second film half. The method also involves attaching a zipper enclosure to the top edge of the first and second film halves. Furthermore, the method involves forming first and second side seals through the raised rib-like elements in the first film half and the second film half using a heated knife, heated wire, or heated seal bar that does not flatten the plurality of raised rib-like elements.

Additional feature and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific implementations thereof that are illustrated in the appended drawings. It should be noted that the figures are not drawn to scale, and that elements of similar structure or function are generally represented by like reference numerals for illustrative purposes throughout the figures. Understanding that these drawings depict only typical implementations of the invention and are not therefore to be considered to be limiting of its scope, the invention will be described and explained with additional specificity and detail through the use of the accompanying drawings in which.

DETAILED DESCRIPTION

One or more implementations of the present invention include thermoplastic bags with expandable seals and/or low recovery force. In particular, the thermoplastic bags can comprise structural elastic-like film (SELF) patterns. As described below, the SELF patterns provide the thermoplastic bags with various advantages. For example, the SELF patterns can provide the ability for the thermoplastic bag to stretch to accommodate more volume. Furthermore, in one or more implementations, the thermoplastic bag further includes side seals including a SELF pattern. The SELF pattern in the side seals can allow the side seals to expand to accommodate the expansion of the rest of the thermoplastic bag.

Additionally, in one or more implementations, the thermoplastic bag includes a low recovery force. In other words, despite having SELF'ing, the thermoplastic bags are not elastic and do not have shape memory. In particular, thermoplastic bags having a low recovery force can have a reduced rebound ratio. More specifically, thermoplastic bags having a low recovery force, when expanded under strain consistent with use of a thermoplastic bag, recover only up to 50 percent of the expansion. The reduced rebound ratio or, in other words, the low recovery force, allows the thermoplastic bag to hold the contents secure without smashing delicate items or requiring special closure mechanisms to maintain closure while under inside forces. More particularly, by having a reduced rebound ratio rather than truly elastic behavior, the thermoplastic bag can reduce or prevent rebound of the SELF'ing pattern directing force against the closure mechanism.

In addition to allowing for an increased volume within the thermoplastic bag, the SELF'ing pattern can also help reduce unintended opening of the thermoplastic bag. For example, when the bag is full of contents (e.g., a liquid) and is dropped against a surface, a resulting force pushes the contents against the closure mechanism, which can often result in the closure mechanism opening and the contents spilling. One or more implementations of thermoplastic bag with expandable seals can prevent or reduce resulting force pushing the contents against the closure mechanism. In particular, the SELF'ing pattern and the expandable seals can expand outward and absorb force, resulting is less force acting against the closure mechanism.

One or more implementations include thermoplastic films with strainable networks created by a SELF'ing process. The strainable network can comprise a plurality of raised rib-like elements extending in a direction perpendicular to a main surface of the thermoplastic film. The raised rib-like elements can be surrounded by a plurality of web or land areas. The raised rib-like elements and web areas can comprise a strainable network that provides the thermoplastic film with tailored rebound ratio or low recovery force. In particular, when subjected to an applied load, the raised rib-like elements can initially undergo a substantially geometric deformation before undergoing substantial molecular-level deformation when subjected to an applied load. On the other hand, the web areas can undergo a substantially molecular-level and geometric deformation in response to the applied strain. U.S. Pat. Nos. 5,518,801 and 5,650,214 each disclose processes for forming strainable networks using SELF'ing processes. The contents of each of the aforementioned patents are incorporated in their entirety by reference herein.

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene-based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly(ethylene-butylacrylate), polyurethane, poly(ethylene-propylene-diene), ethylene-propylene rubber, nylon, etc.

Some of the examples and description herein below refer to films formed from linear low-density polyethylene. The term "linear low-density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). Still further examples use a gas phase LLDPE, which is a hexene gas phase LLDPE formulated with slip/AB (MI=1.0; $\rho$=0.926). One will appreciate that the present disclosure is not limited to LLDPE and can include "high density polyethylene" (HDPE), "low density polyethylene" (LDPE), and "very low-density polyethylene" (VLDPE). Indeed, films made from any of the previously mentioned thermoplastic materials or combinations thereof can be suitable for use with the present disclosure.

Some implementations of the present disclosure may include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic materials. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 70.0% met, at least 80.0%, at least 90% met, at least 95.0% met, at least 99.0% met, or even at least 99.9% met.

Additional additives that may be included in one or more implementations include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

One of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by conventional film-making processes (e.g., casting and blowing). Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (mono-axial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and a cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a film with layers having different compositions. Such multi-layer film may later be provided with a SELF'ing pattern to provide the benefits of the present disclosure.

In a blown film process, the die can be an upright cylinder with a circular opening. Rollers can pull molten thermoplastic material upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

One or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, corona lamination, extrusion coating, ultrasonic bonding, static bonding, cohesive bonding and combinations thereof. Adjacent sub-layers of an individual layer may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

Figure 1A:
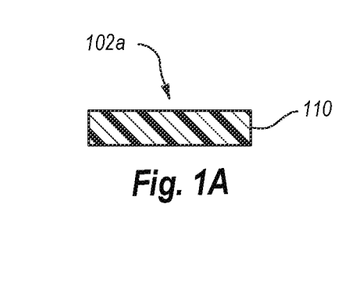
FIGS. 1A-1C show partial side cross-sectional views of films having varying numbers of sublayers according to one or more implementations of the present disclosure.
Figure 1B:
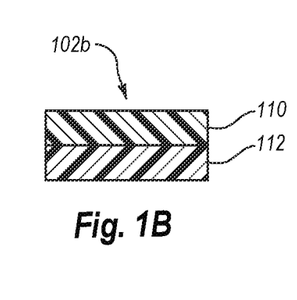
Figure 1C:
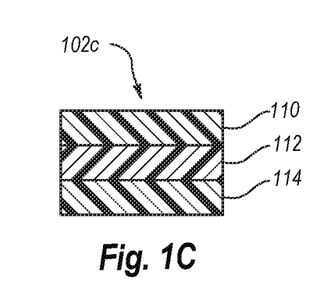

Films forming thermoplastic bags with flexible seals and/or low recovery force may include a single film formed from one, two, three, or more layers of thermoplastic material. FIGS. 1A-1C are partial cross-sectional views of multi-layer films into which a SELF'ing pattern can be formed. Such films can then be used to form products, such as a thermoplastic bag. In some implementations, the film may include a single layer film 102a, as shown in FIG. 1A, comprising a single layer 110. In other embodiments, the film can comprise a two-layer film 102b as shown in FIG. 1B, including a first layer 110 and a second layer 112. The first and second layers 110, 112 can be coextruded. In such implementations, the first and second layers 110, 112 may optionally include different grades of thermoplastic material and/or include different additives, including polymer additives. In yet other implementations, a film be a tri-layer film 102c, as shown in FIG. 1C, including a first layer 110, a second layer 112, and a third layer 114. In yet other implementations, a film may include more than three layers. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the film layers can comprise layer ratios of 20:20:60, 40:40:20, 15:70:15, 33:34:33, 20:60:20, 40:20:40, or other ratios.

Furthermore, as mentioned above one or more characteristics of the thermoplastic films can be tailored to produce a desired amount of low recovery force. In particular, one or more implementations can involve tailoring the composition of the thermoplastic film, the orientation of the thermoplastic film, the number of film layers, the thickness or gauge of the thermoplastic films, or the film processing method (e.g., cast film vs. blown film).

For example, in one or more implementations the composition of the thermoplastic film can be tailored to control the low recovery force. In particular, the thermoplastic material from which the thermoplastic film is formed can comprise linear low density polyethylene and low density polyethylene. More specifically, the thermoplastic material from which the thermoplastic film is formed can comprise between 20 percent and 80 percent linear low density polyethylene. Still further the thermoplastic material from which the thermoplastic film is formed can comprise between 30 percent and 60 percent linear low density polyethylene. Additionally, in one or more implementations the thermoplastic material from which the thermoplastic film is formed can comprise a blown film.

Figure 2:
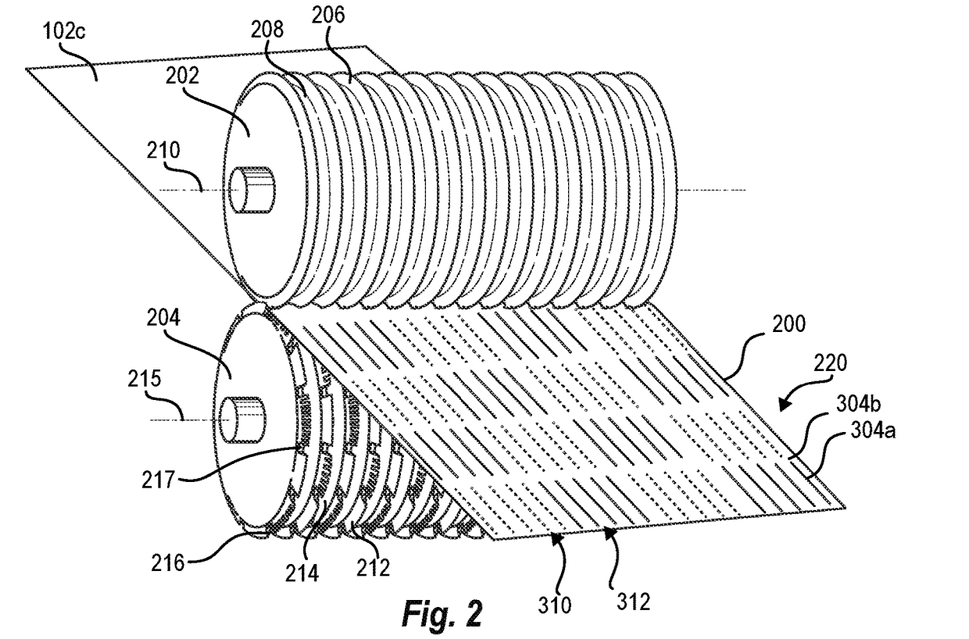
FIG. 2 shows a perspective view of a pair of SELF'ing rollers utilized to form raised rib-like elements in films according to one or more implementations of the present disclosure.

In one or more implementations include a thermoplastic film with a SELF'ing pattern formed into a thermoplastic bag (e.g., a food storage bag). The raised rib-like elements that make up a SELF'ing pattern may be formed or manufactured in various ways. For example, the SELF'ing pattern may be formed by way of cold deformation process. FIG. 2 shows a pair of SELF'ing intermeshing rollers 202, 204 (e.g., a first SELF'ing intermeshing roller 202 and a second SELF'ing intermeshing roller 204) for creating strainable networks of raised rib-like elements. As shown in FIG. 2, the first SELF'ing intermeshing roller 202 may include a plurality of ridges 206 and grooves 208 extending generally radially outward in a direction orthogonal to an axis of rotation 210. As a result, the first SELF'ing intermeshing roller 202 can be similar to a transverse direction ("TD") intermeshing roller such as the TD intermeshing rollers described in U.S. Pat. No. 9,186,862 to Broering et al., the disclosure of which is incorporated in its entirety by reference herein. The second SELF'ing intermeshing roller 204 can also include a plurality of ridges 212 and grooves 214 extending generally radially outward in a direction orthogonal to an axis of rotation 215. As shown in FIG. 2, in some embodiments, the ridges 216 of the second SELF'ing intermeshing roller 204 may include a plurality of notches 217 that define a plurality of spaced teeth 216.

As shown by FIG. 2, passing a film, such as film 102c, through the SELF'ing intermeshing rollers 202, 204 can produce a thermoplastic film 200 with one or more strainable networks formed by a structural elastic like process in which the strainable networks have a pattern 220 in the form of a checkerboard pattern. As used herein, the term "strainable network" refers to an interconnected and interrelated group of regions which are able to be extended to some useful degree in a predetermined direction providing the web material with an elastic-like behavior in response to an applied and subsequently released elongation.

Figure 3:
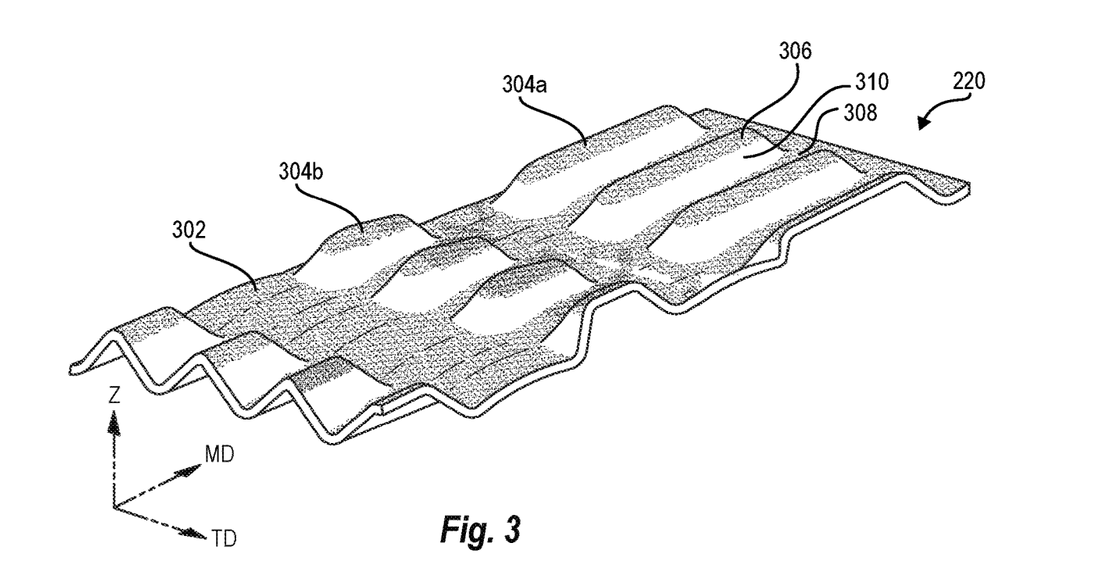
FIG. 3 shows a perspective view of a SELF'ed film according to one or more implementations of the present disclosure.

FIG. 3 shows a portion of the thermoplastic film 200 with the SELF'ing pattern 220. Referring to FIGS. 2 and 3 together, as the film passes through the SELF'ing intermeshing rollers 202, 204, the teeth 216 can press a portion of the film out of plane defined by the film to cause permanent deformation of a portion of the film in the Z-direction. For example, the teeth 216 can intermittently stretch a portion of the film 102c in the Z-direction. The portions of the film 102c that pass between the notched regions 217 of the teeth 216 will remain substantially unformed in the Z-direction. As a result of the foregoing, the thermoplastic film 200 with the SELF'ing pattern 220 includes a plurality of isolated deformed, raised, rib-like elements 304 and at least one un-deformed portion (e.g., sometimes referred to as a web area or land area) 302 (e.g., a relatively flat region). As will be understood by one of ordinary skill in the art, the length and width of the rib-like elements 304 depend on the length and width of teeth 216 and the speed and the depth of engagement of the intermeshing rollers 202, 204. The rib-like elements 304 and the un-deformed web areas 302 form a strainable network.

As shown in FIG. 3, the strainable network of the film 200 can include first thicker regions 306, second thicker regions 308, and stretched, thinner transitional regions 310 connecting the first and second thicker regions 306, 308. The first thicker regions 306 and the stretched, thinner regions 310 can form the raised rib-like elements 304 of the strainable network. In one or more embodiments, the first thicker regions 306 are the portions of the film with the greatest displacement in the Z-direction. In one or more embodiments, because the film is displaced in the Z-direction by pushing the rib-like elements 304 in a direction perpendicular to a main surface of the thermoplastic film (thereby stretching the regions 310 upward) a total length and width of the film does not substantially change when the film is subjected to the SELF'ing process of one or more embodiments of the present invention. In other words, the film 102c (film prior to undergoing the SELF'ing process) can have substantially the same width and length as the film 200 resulting from the SELF'ing process.

As shown by FIG. 3, the rib-like elements can have a major axis and a minor axis (i.e., the rib-like elements are elongated such that they are longer than they are wide). As shown by FIGS. 2 and 3, in one or more embodiments, the major axes of the rib-like elements are parallel to the machine direction (i.e., the direction in which the film was extruded). In alternative embodiments, the major axes of the rib-like elements are parallel to the transverse direction. In still further embodiments, the major axes of the rib-like elements are oriented at an angle between 1 and 89 degrees relative to the machine direction. For example, in one or more embodiments, the major axes of the rib-like elements are at a 45-degree angle to the machine direction. In one or more embodiments, the major axes are linear (i.e., in a straight line) in alternative embodiments the major axes are curved or have otherwise non-linear shapes.

The rib-like elements 304 can undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations that are generally discernible to the normal naked eye when a SELF'ed film or articles embodying the such a film are subjected to an applied load or force. Types of geometric deformation include, but are not limited to bending, unfolding, and rotating.

Thus, upon application of a force, the rib-like elements 304 can undergo geometric deformation before undergoing molecular-level deformation. For example, a strain applied to the film 200 in a perpendicular to the major axes of the rib-like elements 304 can pull the rib-like elements 304 back into plane with the web areas 302 prior to any molecular-level deformation of the rib-like elements 304. Geometric deformation can result in significantly less resistive forces to an applied strain than that exhibited by molecular-level deformation.

As shown by FIGS. 2 and 3, groups of rib-like elements 304 can be arranged in different arrangements to form a SELF'ing pattern. For example, a first plurality of raised rib-like elements 304a can be arranged in a first pattern 310 and a second plurality of raised rib-like elements 304b arranged in a second pattern 312. The first and the second patterns 310, 312 of raised rib-like elements 304a, 304b can repeat across the thermoplastic film 200. As shown by FIG. 2, first and the second patterns 310, 312 of raised rib-like elements 304a, 304b can form a checkerboard pattern 220.

In one or more implementations, the first pattern 310 is visually distinct from the second pattern 312. As used herein, the term "visually distinct" refers to features of the web material which are readily discernible to the normal naked eye when the web material or objects embodying the web material are subjected to normal use.

In one or more embodiments, the first pattern 310 of raised rib-like elements 304a comprises a macro pattern while the second pattern 312 of raised rib-like elements 304b comprises a micro pattern. As used herein a macro pattern is a pattern that is larger in one or more ways than a micro pattern. For example, as shown by FIG. 2, the macro pattern 310 has larger/longer raised rib-like elements 304a than the raised rib-like elements 304b of the micro pattern 312. In alternative embodiments, the surface area of a given macro pattern 310 covers more surface area than a surface area covered by a given micro pattern 312. In still further embodiments, a macro pattern 310 can include larger/wider web portions between adjacent raised rib-like elements than web portions between adjacent raised rib-like elements of a micro pattern 312.

As mentioned above, the raised rib-like elements 304a are longer than the raised rib-like elements 304b. In one or more embodiments, the raised rib-like elements 304a have a length at least 1.5 times the length of the raised rib-like elements 304b. For example, the raised rib-like elements 304a can have a length between 1.5 and 20 times the length of the raised rib-like elements 304b. In particular, the raised rib-like elements 304a can have a length 2, 3, 4, 5, 6, 8, or 10 times the length of the raised rib-like elements 304b.

While FIGS. 2 and 3 illustrate a particular SELF'ing pattern (e.g., a checkerboard pattern), other implementations can include other patterns. For example, the raised-rib like elements can be arranged in other patterns such as diamonds, hexagons, circles, non-symmetric shapes. Furthermore, as mentioned above one or more characteristics of the SELF'ed thermoplastic films can be tailored to produce a desired amount of low recovery force. In particular, one or more implementations can involve tailoring the SELF'ing pattern orientation, SELF'ing pattern shape, depth of engagement of the SELF'ing rollers (e.g., the height of the raised rib-like elements), or the location of the SELF'ing pattern to control the low force recovery of the SELF'ed film.

More specifically, in one or more implementations, increasing the percentage of the land areas can decrease the low force recovery of the SELF'ed film. In other works, decreasing the density of the raised rib-like elements can decrease the low force recovery of the SELF'ed film. On the other hand, increasing the size of the raised rib-like elements can increase the elasticity of SELF'ed film.

Figure 4:
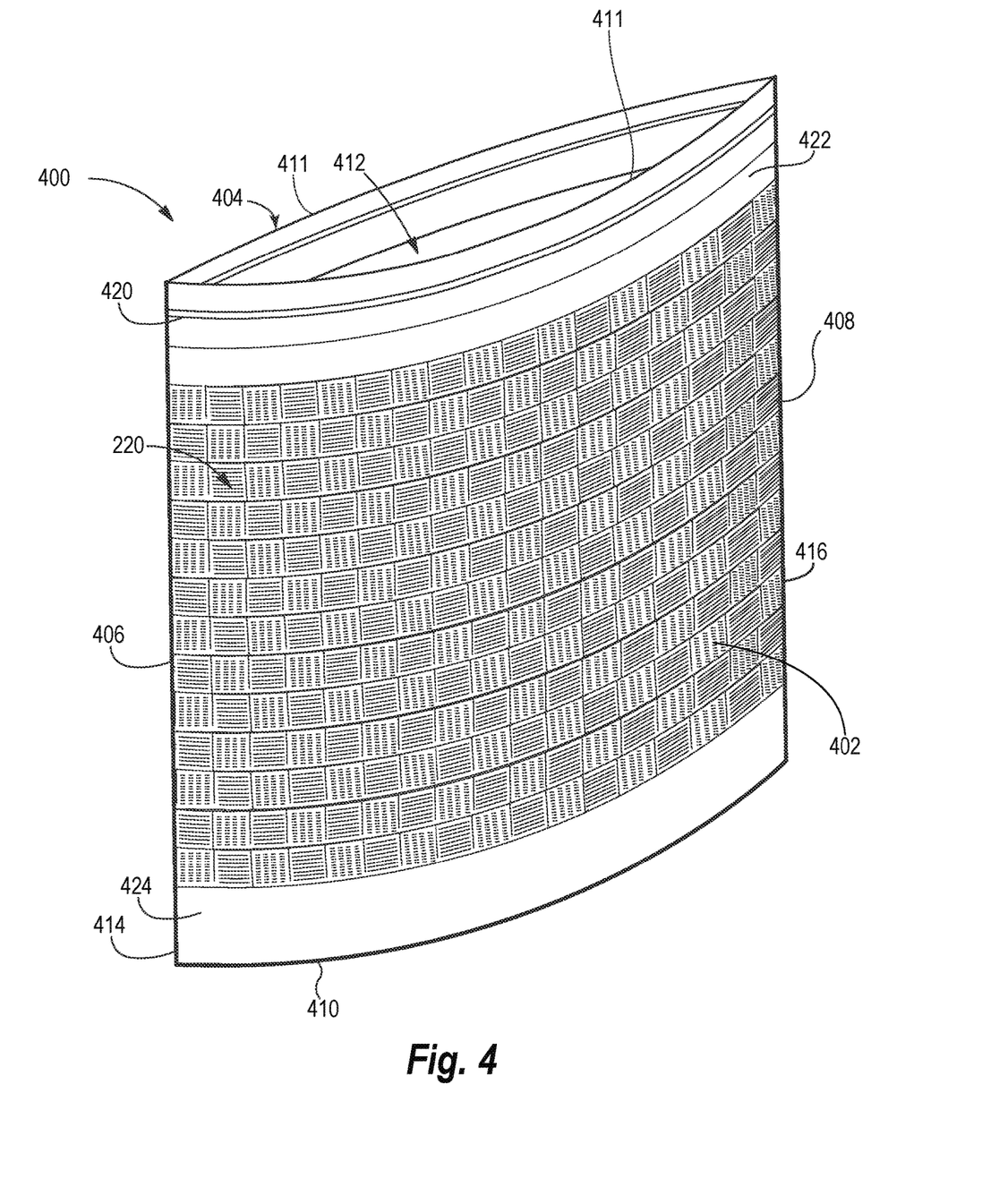
FIG. 4 shows a perspective view of a thermoplastic bag having flexible seals according to one or more implementations of the present disclosure.

FIG. 4 illustrates an implementation of a thermoplastic bag with one or more of flexible side seal or low recovery force. In particular, FIG. 4 is a perspective view of a thermoplastic bag 400 with a checkerboard SELF'ing pattern 220. The thermoplastic bag 400 includes a first sidewall 402 and a second sidewall 404. Each of the first and second sidewalls 402, 404 includes a first side edge 406, a second opposite side edge 408, a bottom edge 410 extending between the first and second side edges 406, 408, and top edge 411 extending between the first and second side edges 406, 408 opposite the bottom edge 410. In some implementations, the first sidewall 402 and the second sidewall 404 are joined together along the first side edges 406, the second opposite side edges 408, and the bottom edges 410. The first and second sidewalls 402, 404 may be joined along the first and second side edges 406, 408 and bottom edges 410 by any suitable process such as, for example, a heat seal. For example, FIG. 4 illustrates that the first and second sidewalls 402, 404 are joined by heat seals 414, 416 at the first and second side edges 406, 408. In alternative implementations, the first and second sidewalls 402, 404 may not be joined along the side edges. Rather, the first and second sidewalls 402, 404 may be a single uniform piece. In other words, the first and second sidewalls 402, 404 may form a sleeve or a balloon structure.

In some implementations, the bottom edge 410 or one or more of the side edges 406, 408 can comprise a fold. In other words, the first and second sidewalls 402, 404 may comprise a single unitary piece of material. The top edges 411 of the first and second sidewalls 402, 404 may define an opening 412 to an interior of the thermoplastic bag 400. In other words, the opening 412 may be oriented opposite the bottom edge 410 of the thermoplastic bag 400. Furthermore, when placed in a trash receptacle, the top edges 411 of the first and second sidewalls 402, 404 may be folded over the rim of the receptacle.

In some implementations, the thermoplastic bag 400 may optionally include a closure mechanism 420 located adjacent to the top edges 411 for sealing the top of the thermoplastic bag 400 to form an at least substantially fully-enclosed container or vessel. As shown in FIG. 4, in some implementations, the closure mechanism 414 comprises a zipper enclosure.

Although the thermoplastic bag 400 is described herein as including a zipper enclosure, one of ordinary skill in the art will readily recognize that other closure mechanisms may be implemented into the thermoplastic bag 400. For example, in some implementations, the closure mechanism 420 may include one or more of flaps, adhesive tapes, a tuck and fold closure, an interlocking closure, a slider closure, a drawtape, or any other closure structures known to those skilled in the art for closing a bag.

As shown by FIG. 4, the thermoplastic bag 400 can comprise areas or zones devoid of deformations. In particular, FIG. 4 illustrates that the thermoplastic bag 400 can comprise a top zone 422 adjacent the hems zipper enclosure that is devoid of deformations. Similarly, FIG. 4 illustrates that the thermoplastic bag 400 can comprise a bottom zone 424 adjacent the bottom edge 410 that is devoid of deformations.

Figure 5A:
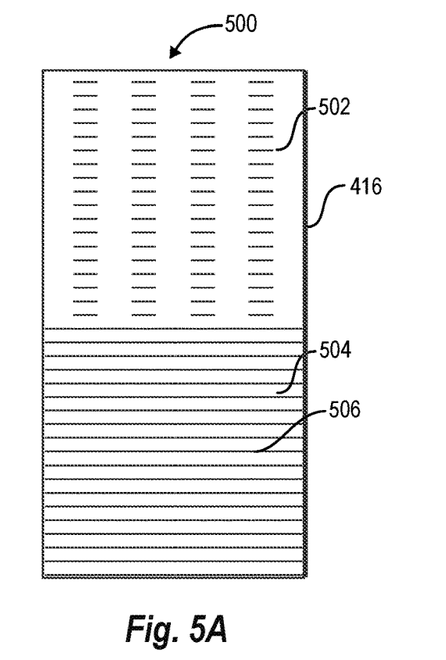
FIG. 5A shows an enlarged partial view of a side seal of the thermoplastic bag of FIG. 4 in un-stretched state according to one or more implementations of the present disclosure.
Figure 5B:
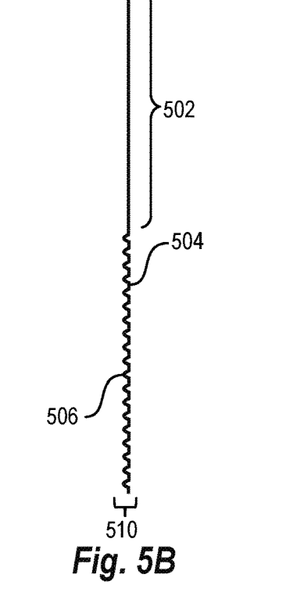
FIG. 5B shows an end view of the side seal of FIG. 5A in the in un-stretched state according to one or more implementations of the present disclosure.

As mentioned previously, the side seals of 414, 416 can be expandable. In other words, the side seals 414, 416 can have the SELF'ing raised rib-like elements formed therein that allow the side seals 414, 416 to expand and otherwise flex in response to an applied strain. In particular, FIG. 5A illustrates a portion 500 of the side of the thermoplastic bag 400 including the side seal 416. FIG. 5B is an end view of the side seal 416. As shown by FIGS. 5A and 5B, the side seal 416, at least in portions, can comprise raised rib-like elements 506 from SELF'ing. The raised rib-like elements of the side seal 416 can allow the side seal 416 to expand. Each raised rib-like elements 506 may have a height measured with respect to the planar or land areas 502, 504. The height of each raised rib-like elements 506 may have a first range of about 0.002 inches (0.0051 cm) to about 0.1 inches (0.254 cm), and a second range of about 0.02 inches (0.0508 cm) to about 0.04 inches (0.1016 cm). In one embodiment, the height may be about 0.03 inches (0.076 cm). The raised rib-like elements 506 may be separated by a distance defining the land areas 504 that may have a first range of about 0.03 inches (0.0762 cm) to about 0.2 inches (0.508 cm), and a second range of about 0.04 inches (0.762 cm) to about 0.08 inches (0.2032 cm).

Figure 5C:
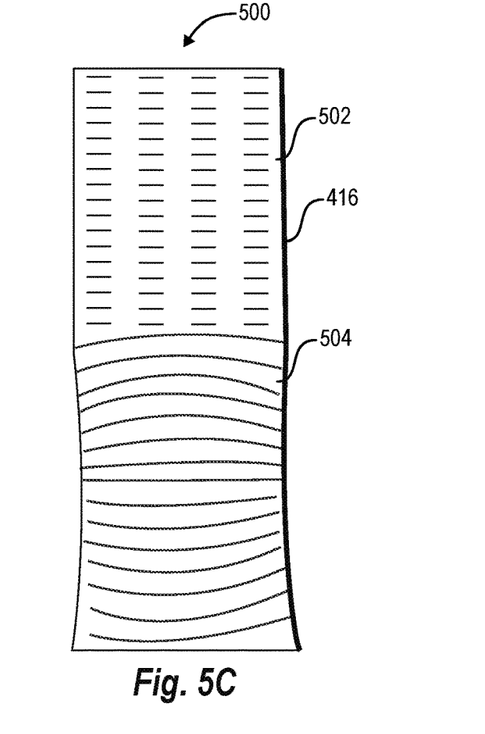
FIG. 5C shows an enlarged partial view of the side seal of the thermoplastic bag of FIG. 4 in a stretched state according to one or more implementations of the present disclosure.
Figure 5D:
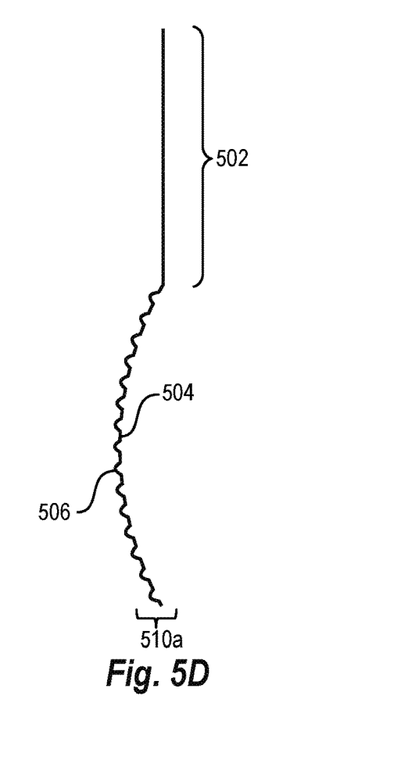
FIG. 5D shows an end view of the side seal of FIG. 5C in a stretched state according to one or more implementations of the present disclosure.

FIGS. 5C and 5D are similar to FIGS. 5A and 5B albeit that the side seal 416 is in an expanded state. As shown, the raised rib-like elements 506 of the side seal 416 have been strained so as to cause the raised rib-like elements of the side seal 416 to unfold, rotate, and/or expand and thereby increase the length of the side seal 416 compared to the un-strained state shown in FIGS. 5A and 5B. FIGS. 5B and 5D further illustrate that a loft 510 of the side seal 416 can increase when the side seal 416 is strained. In particular, FIG. 5D illustrates how the side seal 416 has an increased loft 510a after being stretched.

The raised rib-like elements 506 can provide the side seals with an ability to expand under strains consistent with use of a food storage bag. For example, when subjected to a strain of between 1 and 10 pounds, the side seal can expand between 5 and 75 percent. More particularly, when subjected to a strain of between 2 and 8 pounds, the side seal can expand between 10 and 50 percent. Still further, when subjected to a strain of between 3 and 6 pounds, the side seal can expand between 15 and 30 percent.

To help ensure that the side seals are expandable, the side seals can have a tailored width. For example, the side seals can have a width between 0.50 mils and 10.0 mils. Further, in one or more implementations, the side seals have a width between 1.0 mils and 5.0 mils, a width between 0.50 mils and 2.0 mils, a width between 1.0 mils and 3 mils.

In addition to the raised rib-like elements 506, the side seal can comprise land areas 502, 504. In particular, the land areas 502 can comprise sections of the side seal 416 lacking raised rib-like elements 506. On the other hand, the land areas 504 can comprise web areas between the raised rib-like elements 506. In one or more embodiments, when the length of land areas on a film are oriented parallel to the direction of an applied tensile stress (e.g., in the TD direction), the land areas will resist deformation. In at least one embodiment, this resistance is because the film is not thinned in the land areas, and as such these land areas offer greater yield strength relative to the thinned areas (e.g., the raised rib-like elements). Conversely, when a film includes land areas that are oriented such that they are not parallel to the direction of an applied stress (e.g., as with the land areas in the diamond SELFing pattern), the land area can rotate along its length so that it is pulled parallel to the direction of the stress. This non-parallel land area is not yielding so much as it is rotating to effectively lengthen the amount of overall film deformation in the direction of the stress. Because the land areas resist deformation (e.g., expansion) the location and orientation of the land areas can affect the low recovery force of the thermoplastic film. Thus, one or more implementations include tailored land areas (e.g., size, orientation, density) to control the amount of low force recovery of the thermoplastic film.

Figure 6:
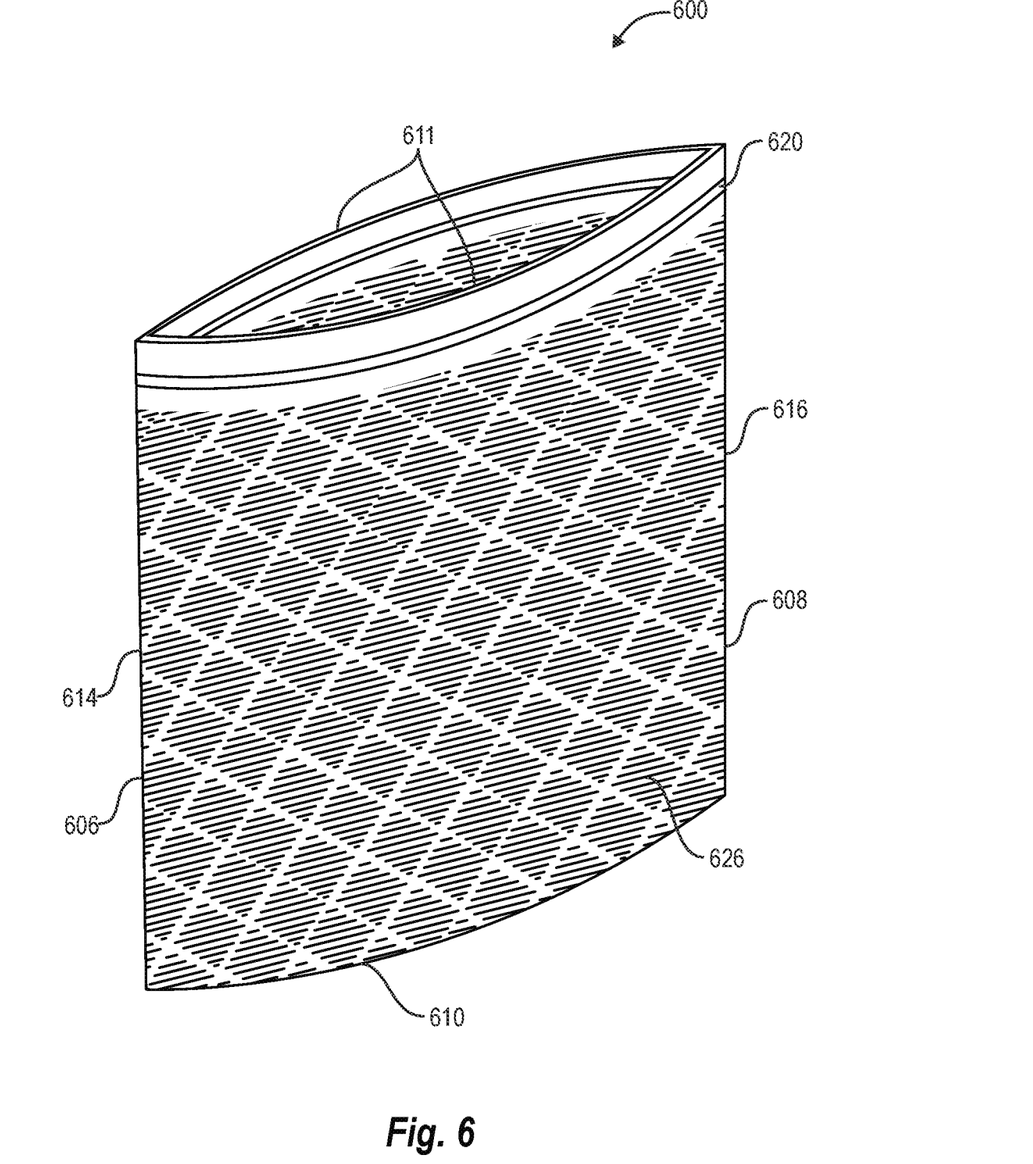
FIG. 6 shows a perspective view of another thermoplastic bag having flexible seals according to one or more implementations of the present disclosure.

While FIGS. 2 and 3 illustrate a particular SELF'ing pattern (e.g., a checkerboard pattern), other implementations can include other patterns. For example, the raised-rib like elements can be arranged in other patterns such as diamonds, hexagons, circles, non-symmetric shapes. FIG. 6 illustrates an implementation of a thermoplastic bag with one or more of flexible side seal or low recovery force. In particular, FIG. 6 is a perspective view of a thermoplastic bag 600 with a diamond SELF'ing pattern 626. The thermoplastic bag 600 includes a first sidewall 602 and a second sidewall 604. Each of the first and second sidewalls 602, 604 includes a first side edge 606, a second opposite side edge 608, a bottom edge 610 extending between the first and second side edges 606, 608, and top edge 611 extending between the first and second side edges 606, 608 opposite the bottom edge 610. In some implementations, the first sidewall 602 and the second sidewall 604 are joined together along the first side edges 606, the second opposite side edges 608, and the bottom edges 610. The first and second sidewalls 602, 604 may be joined along the first and second side edges 606, 608 and bottom edges 610 by any suitable process such as, for example, a heat seal. For example, FIG. 6 illustrates that the first and second sidewalls 602, 604 are joined by heat seals 614, 616 at the first and second side edges 606, 608.

In some implementations, the bottom edge 610 or one or more of the side edges 606, 608 can comprise a fold. In other words, the first and second sidewalls 602, 604 may comprise a single unitary piece of material. The top edges 611 of the first and second sidewalls 602, 604 may define an opening 612 to an interior of the thermoplastic bag 600. In other words, the opening 612 may be oriented opposite the bottom edge 610 of the thermoplastic bag 600. Furthermore, when placed in a trash receptacle, the top edges 611 of the first and second sidewalls 602, 604 may be folded over the rim of the receptacle.

In some implementations, the thermoplastic bag 600 may optionally include a closure mechanism 620 located adjacent to the top edges 611 for sealing the top of the thermoplastic bag 600 to form an at least substantially fully-enclosed container or vessel. As shown in FIG. 6, in some implementations, the closure mechanism 614 comprises a zipper enclosure.

Although the thermoplastic bag 600 is described herein as including a zipper enclosure, one of ordinary skill in the art will readily recognize that other closure mechanisms may be implemented into the thermoplastic bag 600. For example, in some implementations, the closure mechanism 620 may include one or more of flaps, adhesive tapes, a tuck and fold closure, an interlocking closure, a slider closure, a drawtape, or any other closure structures known to those skilled in the art for closing a bag.

As shown by FIG. 6, the thermoplastic bag 600 can comprise areas or zones devoid of deformations. In particular, FIG. 6 illustrates that the thermoplastic bag 600 can comprise a top zone adjacent the hems zipper enclosure that is devoid of deformations.

Additionally, FIG. 6 illustrates that the side seals can comprise the raised rib-like elements from SELF'ing. As discussed above, the raised rib-like elements, in connection with one or more of the width, material composition, etc. can provide the side seals with the ability to expand when strained under conditions consistent with use as a food storage bag (i.e., between 1 and 10 pounds of strain).

Manufacturing of a bag with an expandable side seals and/or low recovery force may be accomplished in a number of different ways. To minimize the incremental costs of the bags, manufacturing may be accomplished in a high-speed automated process. For example, referring to FIG. 7, there is illustrated a schematic of an embodiment for high-speed automated manufacturing of bags. Production of the bags may start with providing a web 700 of pliable thermoplastic material wound into a roll 702. The web 700 may have a width 704 as measured between the first and second side edges 710, 712. The web 700 may be unwound from the roll and may be directed along a machine direction 706. In another embodiment, the web 700 may be extruded as part of the process. The web 700 may be directed through a machine 724 that may attach the first and second interlocking fastening strips 720, 722 near the first and second edges 710, 712. The web 700 may then be folded in half via a folding operation 730 so that the first edge 710 is moved adjacent the second edge 712. The web 700 may have a width 734 that may be half of the initial width 704. Also, the fastening strips 720, 722 may be adjacent and opposite each other. In another embodiment, the web 700 may be folded in half onto the roll 702. Thus, the folding operation 730 may not be needed.

Figure 7:
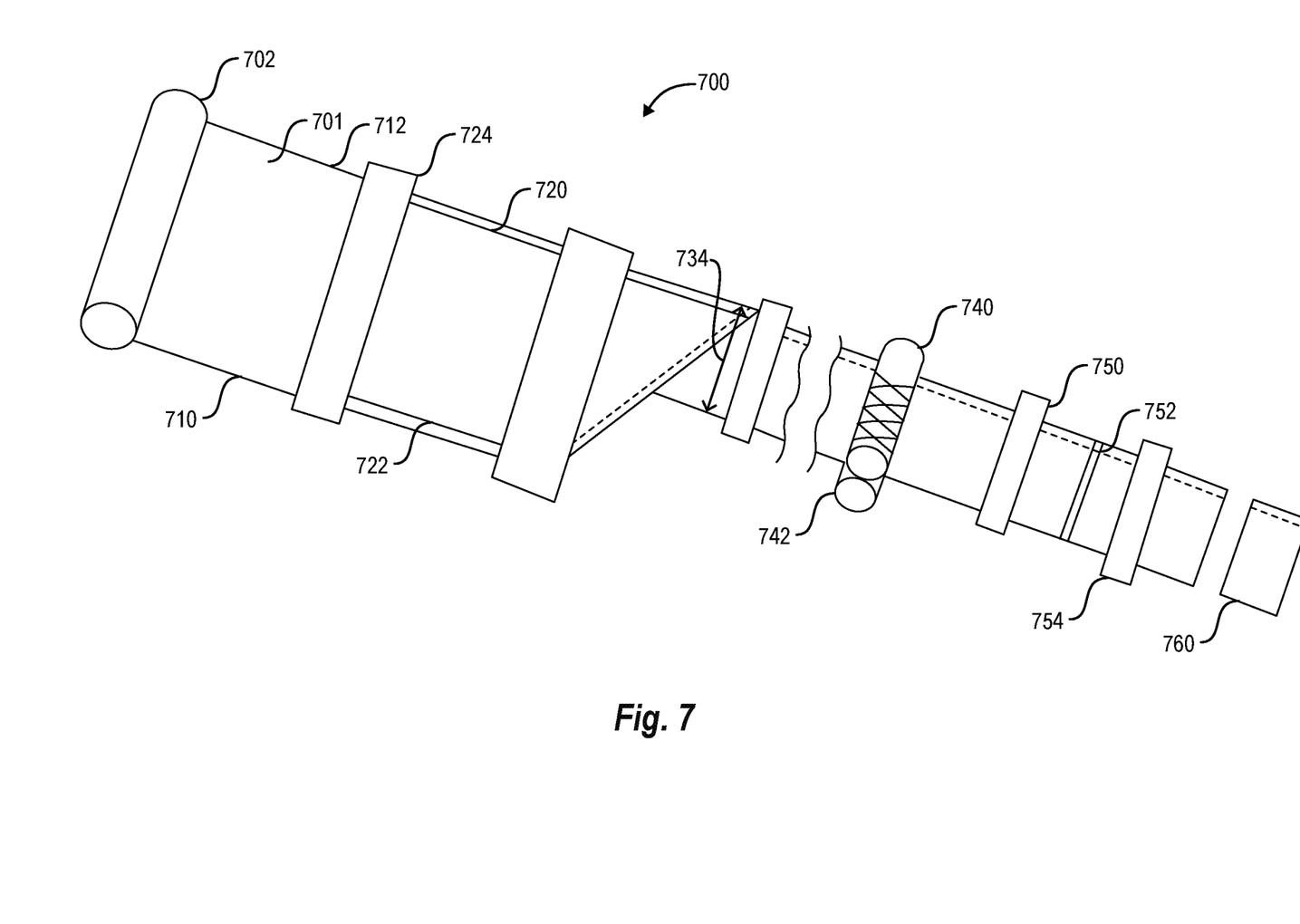
FIG. 7 illustrates a schematic diagram of a process for manufacturing thermoplastic bag with a flexible side seals in accordance with one or more implementations of the present disclosure.

To apply the pattern to the web, two cylindrical rollers 740, 742 may be provided. The rollers 740, 742 may be arranged parallel and adjacent to each other and perpendicular to the machine direction 706. The web 700 may be directed between the rollers 740, 742 which may be made to rotate in opposite directions. The cylindrical surfaces of the rollers 740, 742 may have a pattern including a plurality of raised portions as described above in relation to the SELF'ing intermeshing rollers 202, 204 described above. The raised portions may extend both radially about the cylindrical rollers 740, 742 and axially along the cylindrical rollers. The raised portions may correlate to the ribs that may be formed into the finished bag. Accordingly, as the web is directed between the rollers, the pattern may be formed into the thermoplastic material. Additionally, as illustrated, the cylindrical surface at an end 746, 748 of each roller may lack the raised portions and may be smooth. Hence, when the web 700 is directed between the rollers 740, 742 as illustrated in FIG. 7 the fastening strips 720, 722 may pass between the smooth ends 746, 748 and may not formed with the pattern. In various embodiments, directing the web 700 between the opposing rollers 740, 742 may result in decreasing the thickness of the web. When the thickness of the web is reduced, the webs may take on different strength or tear characteristics.

The web may be directed through other processing steps to further process the finished bag. For example, the web 700 may be directed through a side sealing operation 750 in which the folded web may be sealed together by side seals 752. As may be appreciated, the side seals 752 may correspond to the side edges of the finished bag. In one or more implementations, the side sealing operation 750 is configured to produce a quality seal (e.g., no pin holes or other points of failure) without flattening out the raised rib-like elements of the SELF'ing pattern. For example, the side sealing operation 750 can comprise a heated knife or heated wire that melts the and cuts through the SELF'ed web of thermoplastic material to create a relatively thin side seal that retains the raised rib-like elements. In alternative implementations, the side sealing operation 750 can comprise heated seal bars of reduced thickness that do not flatten the raised rib-like elements during the seal creation process.

The web may be directed through a cutting operation 754 so that individual bags 760 may be separated from the web and placed in packaging. In another embodiment, the side seal and cutting operations may be performed at the same time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. Moreover, any combination of the above-described elements in all possible variations thereof is encompassed by the invention unless otherwise indicated herein or otherwise clearly contradicted by context. All changes that come within the meaning and range of equivalency of the claims are to be embraced within their scope.

We claim:

1. A thermoplastic bag, comprising:
   first and second sidewalls comprising a thermoplastic material;
   the first and second sidewalls comprising a first side edge, an opposite second side edge, a bottom edge, and an opening along respective top edges;
   a closure mechanism that provides for selective closing of the top edges;
   a first side seal extending along the first side edge;
   a second side seal extending along the second side edge; and
   a plurality of raised rib-like elements formed in the first and second sidewalls;
   wherein the plurality of raised rib-like elements have a rebound ratio such that when the raised rib-like elements undergo an expansion of 15-30 percent under a strain of 3 to 6 pounds, the raised rib-like elements rebound less than 50 percent of the expansion.

2. The thermoplastic bag as recited in claim 1, wherein the thermoplastic material comprises linear low-density polyethylene and low-density polyethylene.

3. The thermoplastic bag as recited in claim 2, wherein the thermoplastic material comprises between 20 percent and 80 percent linear low-density polyethylene.

4. The thermoplastic bag as recited in claim 3, wherein the thermoplastic material comprises between 30 percent and 60 percent linear low-density polyethylene.

5. The thermoplastic bag as recited in claim 1, wherein: the thermoplastic bag comprises a food storage bag; and the closure mechanism comprises a zipper closure.

6. The thermoplastic bag as recited in claim 1, wherein the first and second side seals comprise raised rib-like elements formed therein.

7. The thermoplastic bag as recited in claim 6, wherein the raised rib-like elements formed in the first and second side seals provide the first and second side seals with an ability to expand.

8. The thermoplastic bag as recited in claim 6, wherein the first and second side seals do not flatten out the raised rib-like elements formed therein.

9. The thermoplastic bag as recited in claim 6, wherein the raised rib-like elements formed in the first and second side seals absorb forces by expanding, and thereby, reduce strain on the closure mechanism of the thermoplastic bag.

10. The thermoplastic bag as recited in claim 6, wherein the first and second side seals comprise land areas between adjacent raised rib-like elements.

11. The thermoplastic bag as recited in claim 1, wherein the first and second side seals have a width between 1.0 mils and 5.0 mils.

12. The thermoplastic bag as recited in claim 1, wherein the raised rib-like elements are arranged in a pattern of diamonds.

13. The thermoplastic bag as recited in claim 1, wherein the raised rib-like elements are arranged in a checkboard pattern.

14. The thermoplastic bag as recited in claim 1, wherein the thermoplastic bag comprises a food storage bag.

15. The thermoplastic bag as recited in claim 1, wherein the first and second side seals comprise heat seals.

16. The thermoplastic bag as recited in claim 1, wherein the first and second sidewalls are transparent.

17. The thermoplastic bag as recited in claim 1, wherein the first and second sidewalls are tinted.

18. The thermoplastic bag as recited in claim 1, further comprising a top zone in each of the first and second sidewalls that is devoid of raised rib-like elements.

19. The thermoplastic bag as recited in claim 1, wherein the closure mechanism comprises a slider closure.

20. The thermoplastic bag as recited in claim 1, wherein the thermoplastic bag comprises a food storage bag.

* * * * *